US008300688B2

(12) United States Patent
Lu et al.

(10) Patent No.: US 8,300,688 B2
(45) Date of Patent: Oct. 30, 2012

(54) METHOD FOR VIDEO TRANSCODING WITH ADAPTIVE FRAME RATE CONTROL

(75) Inventors: Ligang Lu, Somers, NY (US); Shan Liu, Irvine, CA (US)

(73) Assignee: International Business Machines Corporation, Armonk, NY (US)

( * ) Notice: Subject to any disclaimer, the term of this patent is extended or adjusted under 35 U.S.C. 154(b) by 1323 days.

(21) Appl. No.: 12/016,049

(22) Filed: Jan. 17, 2008

(65) Prior Publication Data
US 2008/0112483 A1    May 15, 2008

Related U.S. Application Data

(63) Continuation of application No. 10/661,308, filed on Sep. 12, 2003, now Pat. No. 7,330,509.

(51) Int. Cl.
*H04N 7/12* (2006.01)
*G06K 9/36* (2006.01)

(52) U.S. Cl. .................................. 375/240.03; 382/238

(58) Field of Classification Search ............. 375/240.03, 375/240.08, 240.12, 240.16; 382/236, 238
See application file for complete search history.

(56) References Cited

U.S. PATENT DOCUMENTS

| | | | |
|---|---|---|---|
| 6,490,320 B1 * | 12/2002 | Vetro et al. | 375/240.08 |
| 6,643,327 B1 * | 11/2003 | Wang | 375/240.12 |
| 6,647,061 B1 | 11/2003 | Panusopone et al. | |
| 6,842,483 B1 | 1/2005 | Au et al. | |
| 7,085,320 B2 * | 8/2006 | Ouyang et al. | 375/240.12 |
| 7,088,780 B2 | 8/2006 | Vetro et al. | |
| 7,099,389 B1 * | 8/2006 | Yu et al. | 375/240.12 |
| 7,110,451 B2 | 9/2006 | Nakamura et al. | |
| 2002/0126752 A1 | 9/2002 | Kim | |
| 2003/0016751 A1 | 1/2003 | Vetro et al. | |
| 2005/0226324 A1 | 10/2005 | Ouyang et al. | |

* cited by examiner

*Primary Examiner* — Gims Philippe
(74) *Attorney, Agent, or Firm* — Scully, Scott, Murphy & Presser, P.C.; Daniel P. Morris, Esq.

(57) ABSTRACT

A video transcoding method is provided for transcoding a first signal stream compressed by a first coding scheme to a second signal stream compressed by a second coding scheme. The method employs an adaptive frame rate and a joint temporal-spatial rate control technique, such that the overall quality of compressed MPEG video can be significantly enhanced when the transcoding is controlled in the joint temporal (picture or frame rate) and spatial (quantization) domains. One embodiment considers transcoding from high bit rate video with larger image size (e.g. 4CIF/4SIF, CIF) coded by one coding technique, e.g., MPEG-2 to a lower bit rate video with smaller image size (e.g. CIF, QCIF) coded by the same or another coding technique, e.g., MPEG-4.

10 Claims, 7 Drawing Sheets

GROUP OF PICTURES n

GROUP OF PICTURES n + 1

LUMINANCE (Y)

CHROMINANCE (Cr, Cb)

METHOD FOR VIDEO TRANSCODING WITH ADAPTIVE FRAME RATE CONTROL

RELATED APPLICATIONS

This application is a continuation of U.S. application Ser. No. 10/661,308, filed Sep. 12, 2003.

BACKGROUND OF THE INVENTION

1. Field of the Invention

The present invention relates generally to transcoders for converting or transcoding a first signal stream compressed by a first coding scheme to a second signal stream compressed by a second coding scheme. The subject invention is particularly suitable for transcoding compressed digital video streams such as MPEG video streams.

2. Discussion of the Prior Art

FIG. 1 is a diagram of a conventional prior art Virtual Buffer Verifier wherein a compressed bit stream from a storage device or transmission channel at 100 is input to a decoder buffer 101 which is connected over a communication link 102 to a decoder 103, the output of which at 104 is displayed at 105.

FIG. 2 is an overview of a conventional prior art video compression system wherein an input video stream $F_k$ at 200 is directed as a first input to a picture coder 205 and as an input to a complexity estimator 201. The complexity estimator output estimate $C_k$ at 202 is input to a picture bit allocator 203 whose output $Q_k$ at 205 produces a second input to the picture coder 205. The picture coder 205 operates on the input $F_k$ at 200, under control of the number of bits allocated as indicated by the output $Q_k$, to produce a coded output CDk at 206.

Digital video compression techniques are widely used in many applications to reduce the storage and transmission bandwidth requirements. The dominant digital video compression techniques are specified by the international standards MPEG-1 (ISO/LEC 11718-2), MPEG-2 (ISO/IEC 13818-2) and MPEG-4 developed by the Moving Picture Experts Group (MPEG), part of a joint technical committee of the International Standards Organization (ISO) and the International Electrotechnical Commission (EC). These standards were developed for coding of motion pictures and associated audio signals for a wide range of applications involving the transmission and storage of compressed digital video, including video streaming, video distribution on demand, high-quality digital television transmission via coaxial networks, fiber-optic networks, terrestrial broadcast or direct satellite broadcast; and in interactive multimedia contents stored on CD-ROM, digital tape, digital video disk, and disk drives.

The MPEG standards define the syntax of the compressed bit stream and the method of decoding, but leave considerable space for novelty and variety in the algorithm employed in the encoder. These standards specify a bit stream in which the number of bits used to represent each compressed picture is variable. The variable feature is due to the different types of picture processing, as well as the inherent variation with time of the spatio-temporal complexity of the scene being coded. This leads to the use of buffers to smooth out the fluctuations in bit rate. For a constant-bit-rate storage media or transmission channel, for example, buffering allows the bit rate of the compressed pictures to vary within limits that depend on the size of the buffers, while outputting a constant bit rate to the storage device or transmission channel.

The MPEG video standards specify a coded representation of video for transmission. The standards are designed to operate on interlaced or noninterlaced component video. Each picture has three components: luminance (Y), red color difference (CR), and blue color difference (CB). For 4:2:0 data, the CR and CB components each have half as many samples as the Y component in both horizontal and vertical directions. For 4:2:2 data, the CR and CB components each have half as many samples as the Y component in the horizontal direction but the same number of samples in the vertical direction. For 4:4:4 data, the CR and CB components each have as many samples as the Y component in both horizontal and vertical directions.

An MPEG data stream consists of a video stream and an audio stream that are packed, with system information and possibly other bit streams, into a system data stream that can be regarded as layered. Within the video layer of the MPEG data stream, the compressed data is further layered. A description of the organization of the layers will aid in understanding the present invention.

The layers pertain to the operation of the compression scheme as well as the composition of a compressed bit stream. The highest layer is the Video Sequence Layer, containing control information and parameters for the entire sequence. At the next layer, a sequence is subdivided into sets of consecutive pictures, each known as a Group of Pictures (GOP). FIG. 3 illustrates a general representation of this GOP layer, and illustrates a first GOP n and a second GOP n+1. Decoding may begin at the start of any GOP, essentially independent of the preceding GOP's. There is no limit to the number of pictures that may be in a GOP, nor do there have to be equal numbers of pictures in all GOP's.

The third or "Picture" layer is a single picture. FIG. 4 illustrates a general representation of the Picture layer, and shows a representative case wherein MPEG-2 video having a frame image with rows of 96 pixels and columns of 64 pixels is down-sampled with 2:1 ratio in both vertical and horizontal directions so that a frame image with rows of 48 pixels and columns of 32 pixels can be obtained.

The luminance component of each picture is subdivided into 16×16 regions; the color difference components are subdivided into appropriately sized blocks spatially co-situated with the 16×16 luminance regions; for 4:4:4 video, the color difference components are 16×16, for 4:2:2 video, the color difference components are 8×16, and for 4:2:0 video, the color difference components are 8×8. Taken together, these co-situated luminance region and color difference regions make up the fifth layer, known as "macroblock" (MB). Macroblocks in a picture are numbered consecutively in raster scan order.

Between the Picture and MB layers is the fourth or "Slice" layer. Each slice consists of some number of consecutive MB's. Slices need not be uniform in size within a picture or from picture to picture.

Finally, FIG. 5 illustrates that each MB consists of four 8×8 luminance blocks Y1, Y2, Y3, Y4, and 8, 4, or 2 (for 4:4:4, 4:2:2 and 4:2:0 video) chrominance blocks Cb, Cr. If the width of the luminance component in picture elements or pixels of each picture is denoted as C and the height as R (C is for columns, R is for rows), a picture is C/16 MB's wide and R/16 MB's high.

The Sequence, GOP, Picture, and Slice layers all have headers associated with them. The headers begin with byte-aligned "Start Codes" and contain information pertinent to the data contained in the corresponding layer.

A picture can be either field-structured or frame-structured. A frame-structured picture contains information to reconstruct an entire frame, i.e., two fields, of data. A field-structured picture contains information to reconstruct one field. If the width of each luminance frame (in picture elements or pixels) is denoted as C and the height as R (C is for columns, R is for rows), a frame-structured picture contains information for C×R pixels and a field-structured picture contains information for C×R/2 pixels.

A macroblock in a field-structured picture contains a 16×16 pixel segment from a single field. A macroblock in a frame-structured picture contains a 16×16 pixel segment from the frame that both fields compose; each macroblock contains a 16×8 region from each of two fields.

Each frame in an MPEG-2 sequence must consist of two coded field pictures or one coded frame picture. It is illegal, for example, to code two frames as one field-structured picture followed by one frame-structured picture followed by one field-structured picture; the legal combinations are: two frame-structured pictures, four field-structured pictures, two field-structured pictures followed by one frame-structured picture, or one frame-structured picture followed by two field-structured pictures. Therefore, while there is no frame header in the MPEG-2 syntax, conceptually one can think of a frame layer in MPEG-2. Within a GOP, three "types" of pictures can appear.

FIG. 6 illustrates an example of the three types of pictures I, P, B within a GOP. The distinguishing feature among the picture types is the compression method which is used. The first type, Intra-mode pictures or I pictures, are compressed independently of any other picture. Although there are no fixed upper bound on the distance between I pictures, it is expected that they will be interspersed frequently throughout a sequence to facilitate random access and other special modes of operation. Predictively motion-compensated pictures (P pictures) are reconstructed from the compressed data in that picture and two most recently reconstructed fields from previously displayed I or P pictures. Bidirectionally motion-compensated pictures (B pictures) are reconstructed from the compressed data in that picture plus two reconstructed fields from previously displayed I or P pictures and two reconstructed fields from I or P-pictures that will be displayed in the future. Because reconstructed I or P pictures can be used to reconstruct other pictures, they are called reference pictures.

One very useful image compression technique is transform-coding. In MPEG and several other compression standards, the discrete cosine transform (DCT) is the transform of choice. The compression of an I picture is achieved by the steps of 1) taking the DCT of blocks of pixels, 2) quantizing the DCT coefficients, and 3) Huffman coding the result. In MPEG, the DCT operation converts a block of 8×8 pixels into an 8×8 set of transform coefficients. The DCT transformation by itself is a lossless operation, which can be inverted to within the precision of the computing device and the algorithm with which it is performed.

The second step, quantization of the DCT coefficients, is the primary source of loss in the MPEG standards. Denoting the elements of the two-dimensional array of DCT coefficients by $c_{mn}$, where m and n can range from 0 to 7, aside from truncation or rounding corrections, quantization is achieved by dividing each DCT coefficient $c_{mn}$ by $w_{mn} \times QP$, with $w_{mn}$ being a weighting factor and QP being the macroblock quantizer. Note that QP is applied to each DCT coefficient. The weighting factor wmn allows coarser quantization to be applied to the less visually significant coefficients.

There can be several sets of these weights. For example, there can be one weighting factor for I pictures and another for P and B pictures. Custom weights may be transmitted in the video sequence layer, or default values may be used. The macroblock quantizer parameter is the primary means of trading off quality vs. bit rate in MPEG-2. It is important to note that QP can vary from MB to MB within a picture. This feature, known as adaptive quantization (AQ), permits different regions of each picture to be quantized with different step-sizes, and can be used to equalize (and optimize) the visual quality over each picture and from picture to picture. Typically, for example in MPEG test models, the macroblock quantizer is computed as a product of the macroblock masking factor and the picture normal quantizer (PNQ).

Following quantization, the DCT coefficient information for each MB is organized and coded, using a set of Huffman codes. As the details of this step are not essential to an understanding of the present invention and are generally understood in the art, no further description will be offered here.

Most video sequences exhibit a high degree of correlation between consecutive pictures. A useful method to remove this redundancy before coding a picture is motion compensation. MPEG-2 provides several tools for motion compensation (described below).

All the methods of motion compensation have the following in common. For each macroblock, one or more motion vectors are encoded in the bit stream. These motion vectors allow the decoder to reconstruct a macroblock, called the predictive macroblock. The encoder subtracts the predictive macroblock from the macroblock to be encoded to form the difference macroblock. The encoder uses tools to compress the difference macroblock that are essentially similar to the tools used to compress an intra macroblock.

The type of picture determines the methods of motion compensation that can be used. The encoder chooses from among these methods for each macroblock in the picture. A method of motion compensation is described by the macroblock mode and motion compensation mode used. There are four macroblock modes, intra (I) mode, forward (F) mode, backward (B) mode, and interpolative forward-backward (FB) mode. For I mode, no motion compensation is used. For the other macroblock modes, 16×16 (S) or 16×8 (E) motion compensation modes can be used. For F macroblock mode, dual-prime (D) motion compensation mode can also be used.

The MPEG standards can be used with both constant-bit-rate and variable-bit-rate transmission and storage media. The number of bits in each picture will be variable, due to the different types of picture processing, as well as the inherent variation with time of the spatio-temporal complexity of the scene being coded. The MPEG standards use a buffer-based rate control strategy, in the form of a Virtual Buffer Verifier (VBV), to put meaningful bounds on the variation allowed in the bit rate. As depicted in FIG. 1, the VBV is devised as a decoder buffer 101 followed by a hypothetical decoder 103, whose sole task is to place bounds on the number of bits used to code each picture so that the overall bit rate equals the target allocation and the short-term deviation from the target is bounded. The VBV can operate in either a constant-bit-rate or a variable-bit-rate mode.

In the constant-bit-rate mode, the buffer is filled at a constant bit rate with compressed data in a bit stream from the storage or transmission medium. Both the buffer size and the bit rate are parameters that are transmitted in the compressed bit stream. After an initial delay, which is also derived from information in the bit stream, the hypothetical decoder instantaneously removes from the buffer all of the data associated with the first picture. Thereafter, at intervals equal to the picture rate of the sequence, the decoder removes all data associated with the earliest picture in the buffer.

FIG. 7 illustrates an example of the operation of the VBV and depicts a graph of the fullness of the decoder buffer as a function of time. The buffer starts with an initial buffer fullness of Bi after an initial delay of time T0. The sloped line segments show the compressed data entering the buffer at a constant bit rate. The vertical line segments show the instantaneous removal from the buffer of the data associated with the earliest picture in the buffer. In this example, the pictures are shown to be removed at a constant interval of time T. In general, the picture display interval, i.e., the time interval between the removal of consecutive pictures, may be variable.

For the bit stream to satisfy the MPEG rate control requirements, it is necessary that all the data for each picture be available within the buffer at the instant it is needed by the decoder and that the decoder buffer does not overfill. These requirements translate to upper ($U_k$) and lower ($L_k$) bounds on the number of bits allowed in each picture (k). The upper and lower bounds for a given picture depend on the number of bits used in all the pictures preceding it. For example, the second picture may not contain more than $U_2$ bits since that is the number of bits available in the buffer when the second picture is to be removed, nor less than $L_2$ bits since removing less than $L_2$ bits would result in the buffer overflowing with incoming bits. It is a function of the encoder to produce bit streams that can be decoded by the VBV without error.

For constant-bit-rate operation, the buffer fullness just before removing a picture from the buffer is equal to the buffer fullness just before removing the previous picture minus the number of bits in the previous picture plus the product of the bit rate and the amount of time between removing the picture and the previous picture; i.e., $$\text{buffer fullness before remove } pic = \text{buffer fullness before remove last } pic - \text{bits in last } pic + \text{time between } pic \text{ and last } pic \times \text{bit rate} \quad (1)$$

The upper bound for the number of bits in a picture is equal to the buffer fullness just before removing that picture from the buffer. The lower bound is the greater of zero bits or the buffer size minus the buffer fullness just before removing that picture from the buffer plus the number of bits that will enter the buffer before the next picture is removed. The buffer fullness before removing a given picture depends on the initial buffer fullness and the number of bits in all of the preceding pictures, and can be calculated by using the above rules.

Variable-bit-rate operation is similar to the above, except that the compressed bit stream enters the buffer at a specified maximum bit rate until the buffer is full, when no more bits are input. This translates to a bit rate entering the buffer that may be effectively variable, up to the maximum specified rate. FIG. 8 illustrates an exemplary plot of the buffer fullness under variable-bit-rate operation as a function of time. The buffer operates similarly to the constant-bit-rate case except that the buffer fullness, by definition, cannot exceed the buffer size of Bmax. This leads to an upper bound on the number of bits produced for each picture, but no lower bound.

For variable bit rate operation, the buffer fullness just before removing a picture from the buffer is equal to the size of the buffer or to the buffer fullness just before removing the previous picture minus the number of bits in the previous picture plus the maximum bit rate times the amount of time between removing the picture and the previous picture, whichever is smaller; i.e., $$\text{buffer fullness before remove } pic = \min(\text{buffer fullness before remove last } pic - \text{bits in last } pic + \text{time between } pic \text{ and last } pic \times \text{bit rate}, \text{buffer size}) \quad (2)$$

The upper bound for the number of bits in a picture is again equal to the buffer fullness just before removing that picture from the buffer. As mentioned earlier, the lower bound is zero. The buffer fullness before removing a given picture again depends on the initial buffer fullness and the number of bits in all of the preceding pictures, and can be calculated by using the above rules.

Video transcoding is a process of converting one compressed video stream to another compressed video stream. Video transcoding techniques have been widely used in various present day multimedia applications. There are two advantages to applying transcoding techniques to internet applications such as video downloading and streaming. First, by storing a high quality compressed video stream (rather than the raw video file), a substantial amount of storage space in the server can be saved. Second, by reusing a part of the compressed video information carried in the source video stream, the transcoding process can be greatly simplified in comparison with the traditional encoding process so that it is suitable for online applications. Video transcoding among various bit rates (e.g. from DVD high quality video to wireless low quality video) has to consider the rate control issue to meet the bandwidth, buffer, and delay constraints, etc. In real-world applications, including video on demand, digital video broadcasting, distance learning, etc., a proper algorithm is implemented inside the video transcoder so that the video stream can be transcoded to fit the client's bandwidth capacity without severe quality degradation.

Generally speaking, video transcoders are classified into three types. The type 1 (T1) transcoder is the simplest transcoder. As shown in FIG. 9(a), it re-quantizes the DCT coefficients of the input bit stream by a bigger quantization step size. Consequently, the complexity of the T1 transcoder is very low. However, drift errors can occur in P and B frames and accumulate in P frames until the next I frame is transcoded. Thus, the quality of T1 is poor. In contrast, there is the type 3 (T3) transcoder, which cascades a full decoder with a full encoder as shown in FIG. 9(c). Because motions are re-estimated and residues are recalculated in the T3 transcoder, drift errors can be completely eliminated. However, this results in a very high computational complexity, and T3 is not suitable for low complexity or real-time applications. To compromise the quality and the complexity, the type 2 (T2) transcoder was proposed. It is shown in FIG. 9(b). Since the T2 transcoder recalculates residues based on the previous transcoded frame image, drift errors can be avoided and the final reconstruction error depends only on the quantization noise. Thus, T2 results in high quality transcoded video. The complexity of T2 is higher than that of T1 due to the IDCT/MCP/DCT (inverse discrete cosine transform/motion compensated picture/discrete cosine transform) operations. However, T2 is significantly less complex than T3, since it re-uses the motion information carried by the input bit stream instead of processing motion re-estimation. Hence, T2 provides a good solution to high quality and low complexity transcoding applications.

There has been some previous work proposed for T1 and T2 transcoders, while T3 transcoders can simply adopt any rate control approach designed for the traditional video encoder. Consider the transcoding of MPEG-2 video of a larger spatial resolution, e.g. 704×576 or 720×480 (4CIF or 4SIF), 352×288 (CIF) to MPEG-4 video of a lower spatial resolution, e.g. 352×288 (CIF), 176×144 (QCIF). First, the transcoder needs to down-sample the input MPEG-2 video. The motion vectors carried by the MPEG-2 stream will be reused in the transcoding process. That is, MPEG-2 motion vectors are sub-sampled, and the coding mode for each down-sampled macroblock is examined.

The previous published work on video transcoding aims at rate conversion among different bit rates, usually from high to low. The frame-level rate control schemes were recently proposed by Lie et al. {W.-N. Lie and Y.-H. Chen, "Dynamic rate control for MPEG-2 bit stream transcoding," IEEE Proc. ICIP, 2001, vol. 1 pp. 477-480} and Lu et al. {L. Lu, at el. "Efficient and low-cost video transcoding," SPIE Proc. VCIP, 2002, vol. 4671, pp. 154-163}. However, both of them tried to control the bit rate at a constant frame rate, i.e. frame skipping was not adopted.

SUMMARY OF THE INVENTION

The present invention provides a video transcoding method with an adaptive frame rate and a joint temporal-spatial rate control technique. The overall quality of compressed MPEG video is significantly enhanced when the transcoding is controlled in the joint temporal picture or frame rate) and spatial (quantization) domain. The temporal domain concerns the picture or frame rate which is the number of pictures or frames per unit time. The spatial domain concerns the precise manner in which each picture or frame is quantized and coded during the image compressing operation, which involves determining a target bit allocation for each picture or frame and how each microblock is to be coded The present invention provides a method for efficient video transcoding with an adaptive picture or frame rate, and in one embodiment considers the transcoding from high bit rate video with larger image size (e.g. 4CIF/4SIF, CIF) coded by one coding technique, e.g., MPEG-2 to lower bit rate video with smaller image size (e.g. CIF, QCIF) coded by the same or another coding technique, e.g., MPEG-4. The embodiment considers the transcoding from high bit rate video with larger image size to lower bit rate video with smaller image size since this is a usual application, although the present invention is not limited to that type of transcoding, and has broader general applicability to transcoding a first signal stream compressed by a first coding scheme to a second signal stream compressed by a second coding scheme.

First, the transcoder needs to down-sample the input MPEG-2 video. Since the motion vectors carried by the MPEG-2 stream will be reused in the transcoding process, they are down-sampled or sub-sampled, in addition to down-sampling or sub-sampling the frame pixels, and the coding mode for each down-sampled macroblock is examined. A joint temporal-spatial rate control method is employed to convert the high bit rate MPEG-2 video to the low bit rate MPEG-4 counterpart. The joint temporal-spatial rate control scheme adjusts both the picture or frame rate and the picture or frame quantization step size simultaneously according to the channel bandwidth to achieve a good temporal-spatial quality tradeoff. Due to the reuse of motion vectors, the reference frames (i.e. I and P frames) cannot be skipped to maintain the prediction sequential order, while B frames that carry less information may be skipped in transcoding to save the bits. If necessary, skipped B frames can be easily reconstructed at the decoder to ensure the full frame rate playback. The described MPEG-2 to MPEG-4 video transcoder with adaptive frame rate and joint temporal-spatial rate control can out-perform the prior art transcoding methods that transcode with constant frame rate. The complexity of the described transcoder in the preferred embodiment of this invention is low so that it can be used in real-time applications.

BRIEF DESCRIPTION OF THE DRAWINGS

The present invention will be understood by reference to the drawings, wherein:

FIG. 9 (c) is a block diagram of the type 3 (T3) transcoder;

FIG. 11 (b) shows the motion vector down-sampling process in the transcoder shown in FIG. 11 (a);

DETAILED DESCRIPTION OF THE INVENTION

Spatial Resolution and Motion Vector Down-Sampling Processes in Transcoding

Figure 1:
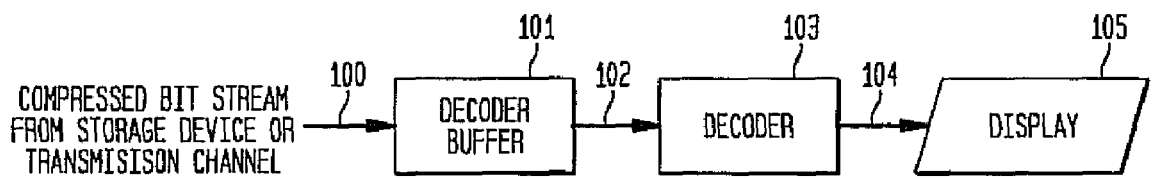
FIG. 1 is a diagram of a conventional prior art Virtual Buffer Verifier.
Figure 2:
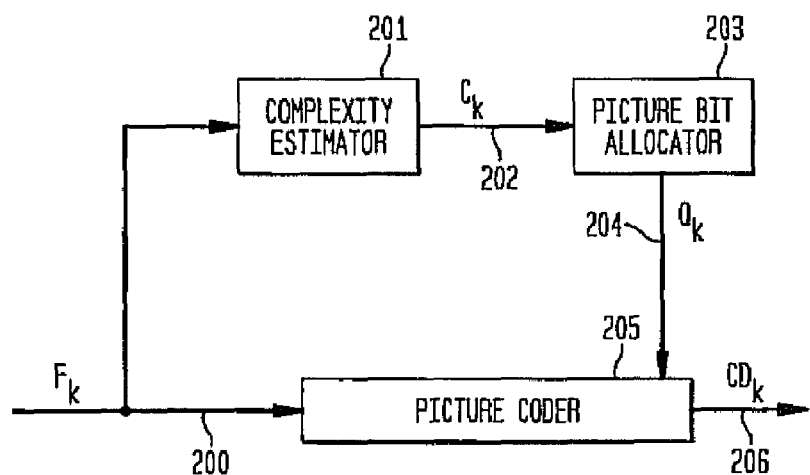
FIG. 2 is an overview of a conventional prior art video compression system.
Figure 3:
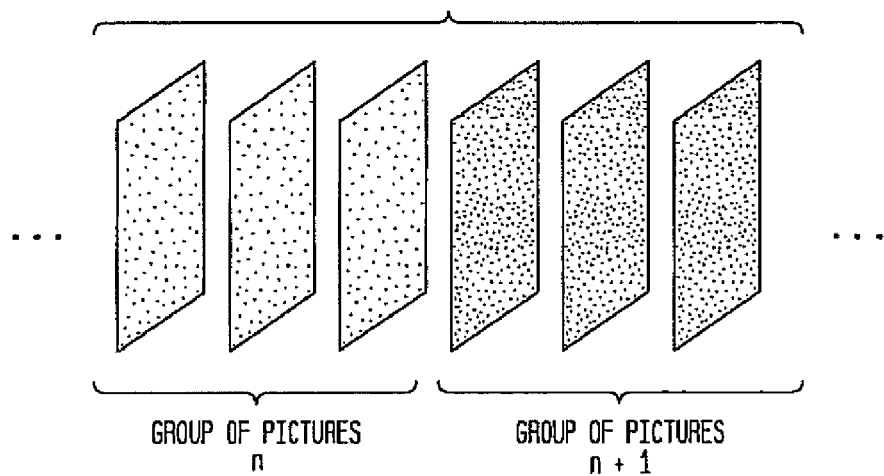
FIG. 3 shows an exemplary set of Group of Pictures (GOP's) layer of compressed data within the video compression layer of an MPEG data stream.
Figure 4:
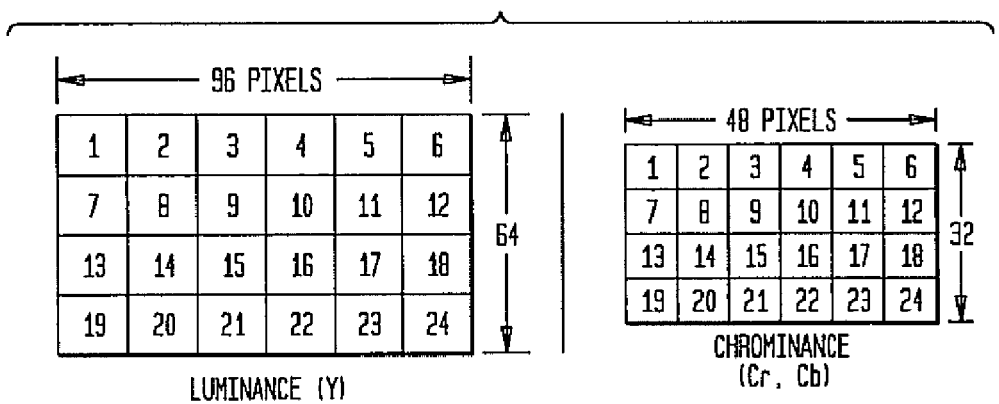
FIG. 4 shows an exemplary Macroblock (MB) subdivision of a picture in the MB layer of compressed data within the video compression layer of an MPEG data stream.
Figure 5:
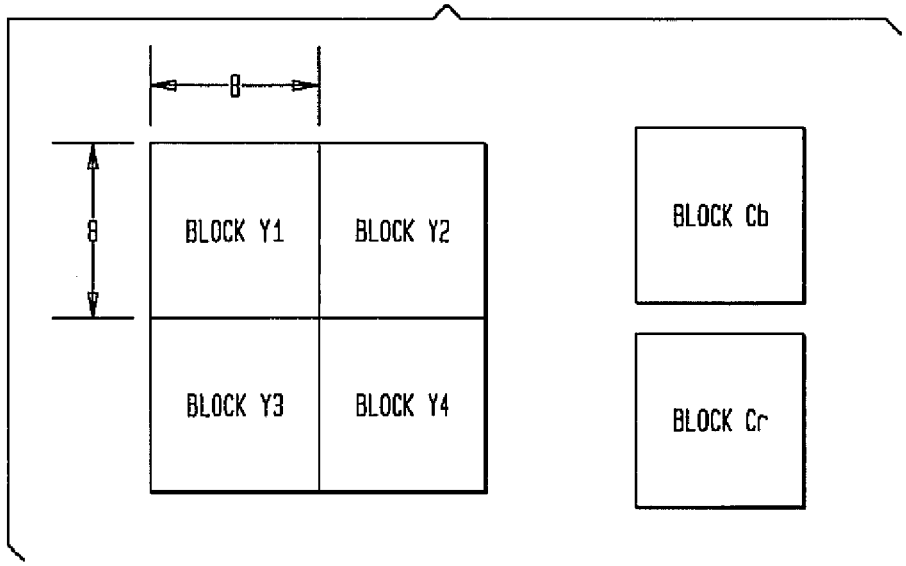
FIG. 5 shows the Block subdivision of a Macroblock.
Figure 6:
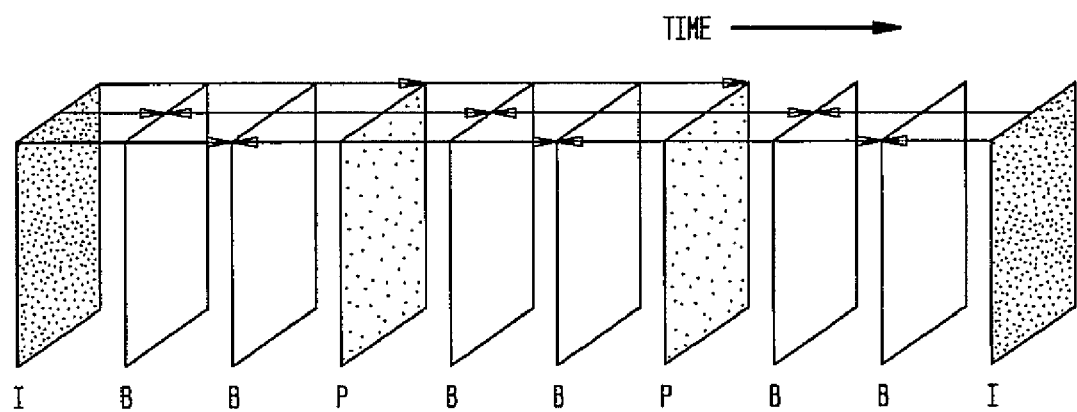
FIG. 6 shows the typical types of Pictures in a typical Group of Pictures.
Figure 7:
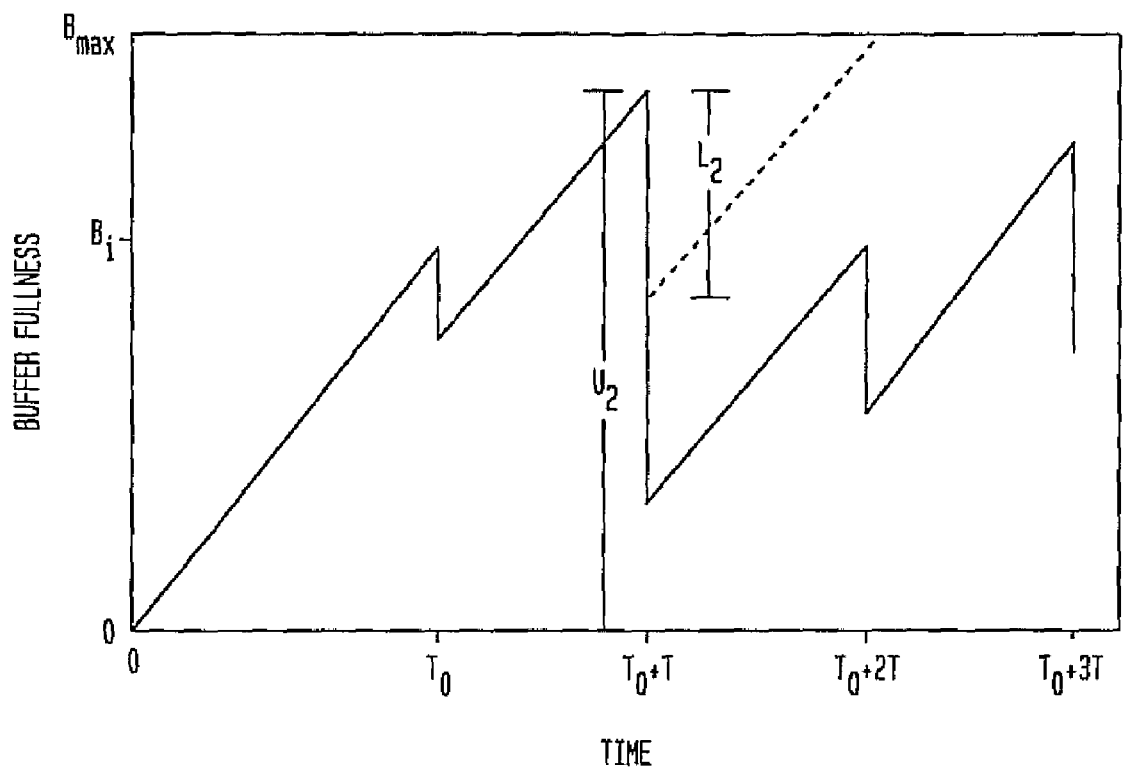
FIG. 7 is an exemplary plot of the evolution of a virtual decoder buffer over time for operation in constant-bit-rate mode.
Figure 8:
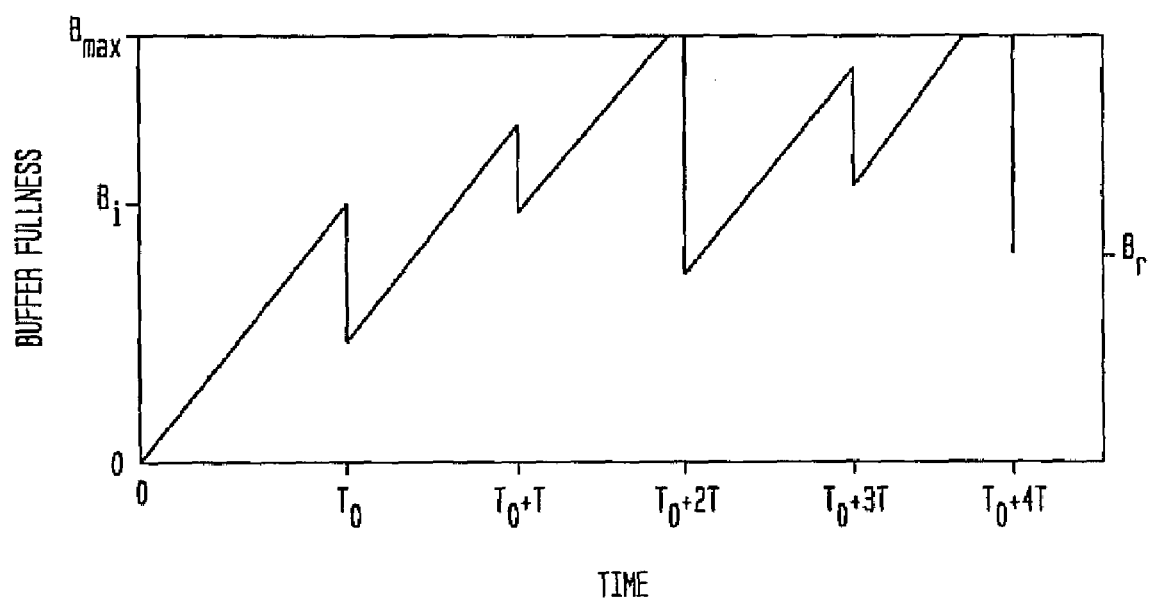
FIG. 8 is an exemplary plot of the evolution of a virtual decoder buffer over time for operation in variable-bit-rate mode FIG. 9 (a) is a block diagram of the type 1 (T1) transcoder.
Figure 9A:
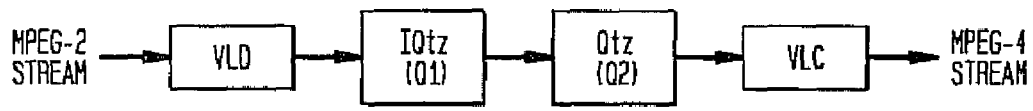
FIG. 9 (b) is a block diagram of the type 2 (T2) transcoder.
Figure 9B:
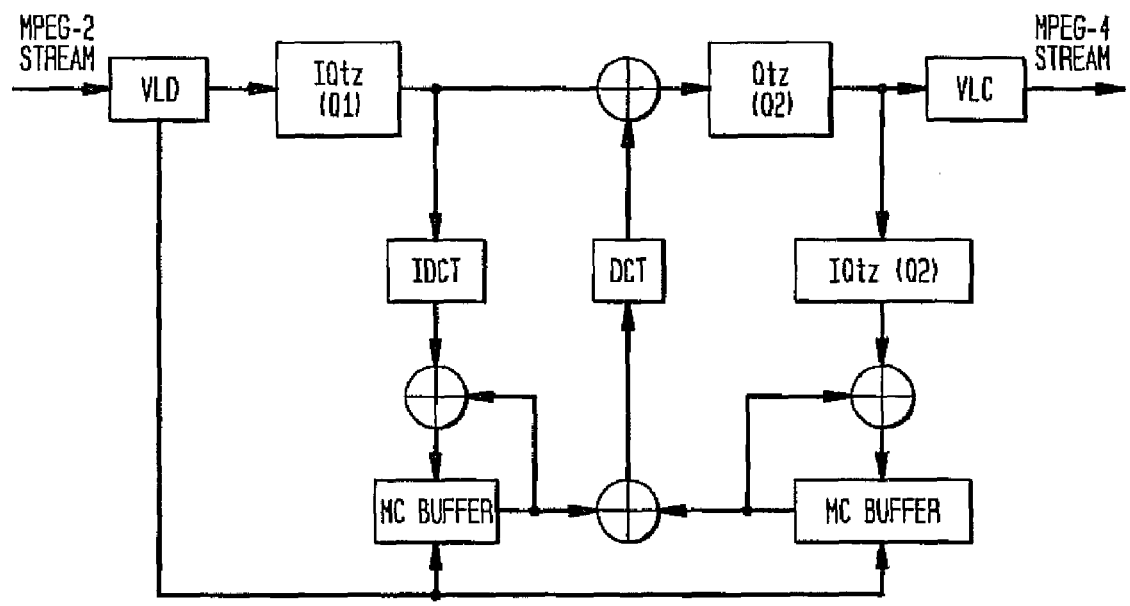
Figure 9C:
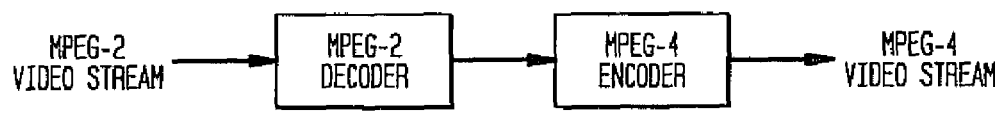
Figure 10:
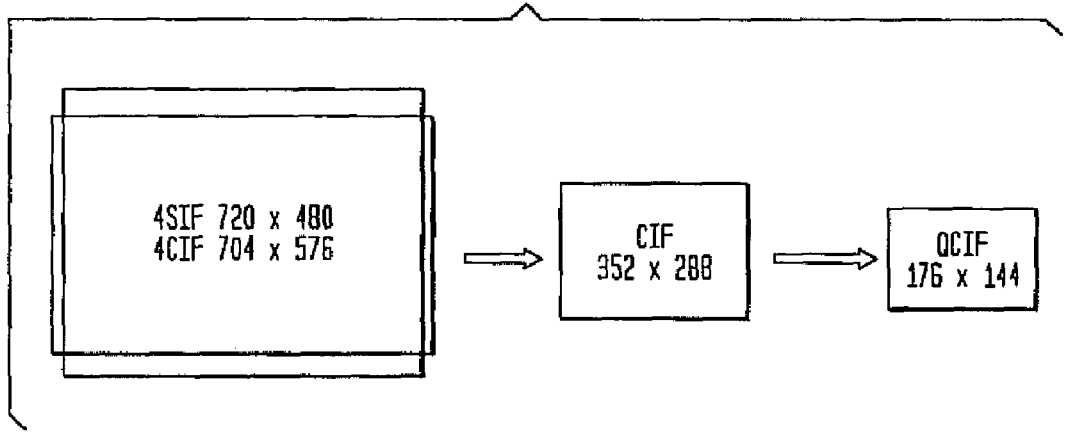
FIG. 10 illustrates the spatial resolution down-sampling.

Without loss of generality, consider the case of spatial resolution down-sampling shown broadly in FIG. 10 where the input is MPEG-2 video with a higher spatial resolution, (e.g. CIF (Common Intermediate Format) resolution 352×288, 4 CIF resolution 704×576, or 4 SIF (Source Input Format) resolution 720×480) while the output is MPEG-4 video with a lower resolution (e.g. CIF resolution 352×288 or QCIF (Quarter CIF) resolution 176×144). Hence, the MPEG-2 frame picture has to be down-sampled to fit the MPEG-4 image size, which is a typical case. The T2 transcoder is adopted so that the resolution down-sampling can be processed in the pixel domain. As shown in FIG. 4, the MPEG-2 video is down-sampled with 2:1 ratio in both vertical and horizontal directions so that the QCIF MPEG-4 frame image can be obtained.

Figure 11A:
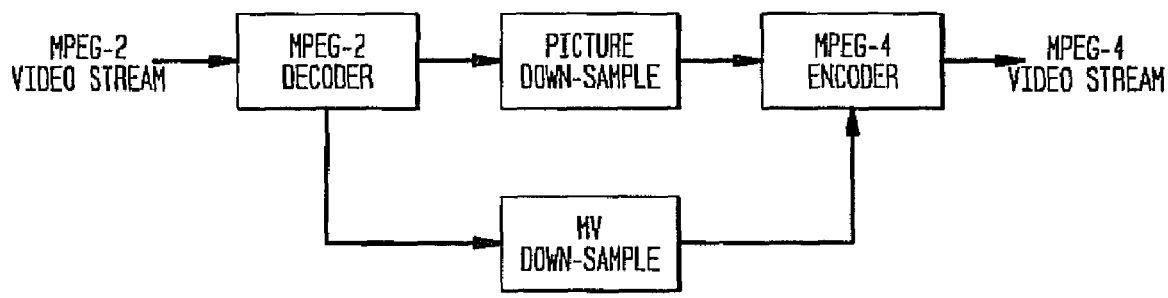
FIG. 11 (a) is a block diagram of a preferred embodiment of a transcoder pursuant to the present invention.

FIG. 11 (a) is a block diagram of a preferred embodiment of a transcoder pursuant to the present invention, and illustrates a general MPEG-2 to MPEG-4 transcoder with spatial resolution down-sampling. An input MPEG-2 video stream is directed to an MPEG-2 decoder which produces outputs to both a picture down-sample and an MV (motion vector down-sample), both of which produce outputs directed to an MPEG-4 encoder which produces an MPEG-4 video stream output.

If the motion vectors carried by the MPEG-2 stream are down-sampled and reused, the transcoder is a type T2 transcoder, and the MPEG-4 encoder does not need to perform the motion estimation. Otherwise, if the motion vectors carried by the MPEG-2 stream are not down-sampled and reused, the transcoder is a Type 3 transcoder, and the MPEG-4 encoder is fully functional and performs the motion estimation. In this example, the T2 transcoder is considered so that motion vectors are down-sampled and reused along with down-sampling of the image pixels.

Figure 11B:
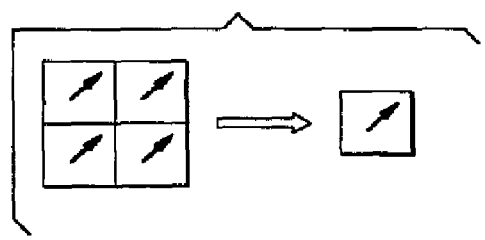

As shown in FIG. 11(b), because the image size is downsampled by two in both horizontal and vertical directions, every four adjacent MBs in the MPEG-2 image are downsampled to one MB to be exploited by the transcoder. One distinct function of the MPEG-2 encoder is the field prediction, for both frame and field pictures. When the field prediction mode is enabled, a frame MB is split into two field MBs, i.e. the top field MB and the bottom field MB. If a field MB of a P frame belongs to the top field, it can be predicted from either the top or the bottom field of the reference frame. Otherwise, it can be predicted from either the bottom field of the reference frame or the top field of the current P frame. Thus, each MB may be associated with up to two motion vectors. Similarly, a field MB of a B frame can be predicted from two fields chosen from two reference frames. Thus, each B frame MB may be associated with up to four motion vectors. In contrast, most MPEG-4 coders do not support the interlaced video format and field prediction. Thus, we ignore the field motion vectors between alternative fields (i.e. pointing from top to bottom or from bottom to top fields) but only examine the remaining field motion vectors as well as the frame MB motion vectors, when processing the down-sampling of motion vectors.

There are several methods to down-sample motion vectors from four MBs to one. One simple solution is to apply low pass filtering, e.g. mean or median filtering, to MPEG-2 motion vectors. This approach has a low computational complexity, but may not provide an accurate result. Furthermore, the four MPEG-2 MBs can be predicted in different modes, e.g. INTRA, ENTER, etc. Thus, a mode decision has to be made in the down-sampling process. In the transcoder of the present invention, the candidate motion vectors and prediction modes decoded from the MPEG-2 stream are exhaustively compared.

The one with the minimum SAD (sum of absolute differences) is selected as the resulting motion vector. It is worthwhile to mention that MPEG-4 also supports the 4MV prediction mode, where the four 8×8 blocks within one MB can be predicted by different modes and motion vectors. In this case, each MPEG-2 MB motion vector can be directly used as the corresponding MPEG-4 block (or sub-MB) motion vector.

Method of Adaptive Frame Rate Transcoding with Joint Temporal-Spatial Rate Control In T2 transcoders, the motion vectors are used. Because in MPEG P frames are used as reference frames to predict B and P frames, they cannot be slipped in transcoding. Otherwise, the prediction chain would be broken, and all frames after the skipped P frame could not be reconstructed correctly. MPEG-2 streams normally contain both P and B frames to reduce temporal redundancy. Unlike P frames, B frames provide temporal scalability and can be skipped without breaking the prediction chain. Hence, in the preferred embodiment of this invention, those B frames which contain less information may be skipped while all I and P frames are transcoded. We define a structure called the sub-GOP (group of picture) that consists of several B frames and ends with a P frame, i.e. B . . . BP. I frame is treated as a sub-GOP by itself. We also define the frame set S to indicate coded/skipped (1/0) B frames:

$$S = [S_1, S_2, \ldots, S_N], S_i \in [0,1], i=1, \ldots N; \quad (3)$$

and Q to denote the set of quantization parameter (QP) of each non-skipped frame, i.e.

$$Q = [Q_1, Q_2, \ldots, Q_N], Q_i \in [Q_{min}, Q_{max}], i=1, \ldots N. \quad (4)$$

Thus, the rate-distortion optimization problem within a sub-GOP is to determine Q* and S*, such that $$[Q^*, S^*] = \operatorname*{argmin}_{Q,S} \sum_{i=1}^{N} D_i(Q, S) \quad (5)$$

$$\text{subject to } \sum_{i=1}^{N} R_i(Q, S) < B_{target},$$

where N is the total number of frames in a sub-GOP, and $S_N$ has to be 1, i.e. coded. As traditionally defined, a GOP starts with an I frame, which is followed by B and P frames. Typically, one video clip contains one or more GOP's, and each GOP may include many sub-GOP's. Here, we focus on solving the problem within one GOP. The same methodology can be easily applied to multiple GOP's.

It is worthwhile to point out that both transcoded and skipped frames contribute to the rate-distortion optimization procedure as defined in (5). That is, the total distortion is the sum of transcoded frame distortion and skipped frame distortion, i.e.

$$\sum_{i=1}^{N} D_i(Q, S) = \sum_{i=1}^{N} \{D_i \mid (S_i = 1) + D_i \mid (S_i = 0)\}. \quad (6)$$

At the decoder a scheme can be used to reconstruct the skipped frames. For instance the frame averaging method reconstructs a skipped frame by a weighted averaging of its transcoded neighboring frames. Since a skipped frame does not consume any bits, the total bit rate is the sum of those of all transcoded frames, i.e.

$$\sum_{i=1}^{N} R_i(Q, S) = \sum_{i=1}^{N} R_i \mid (S_i = 1). \quad (7)$$

The input MPEG-2 video stream is usually coded at full frame rate with higher bit rate. As mentioned before, the goal of using adaptive frame rate control in this invention is to vary both the frame rate and the re-quantization step size simultaneously to achieve a good tradeoff between temporal and spatial resolution for transcoded video. Generally speaking, we can have multiple B frames between two key frames (I or P). Here, without loss of generality, let us focus on a special case where only one B frame is inserted between two key frames. The same method can be extended to multiple B frames. Thus, each sub-GOP consists of either a single I frame or a pair of P and B frames, both predicted from the previous key reference frame. The B frame can be skipped, while the second P frame is a key frame that should always be transcoded. Unlike the prior art transcoding methods which transcode each frame, the adaptive frame rate transcoder in the present invention processes on the basis of one sub-GOP.

Figure 12:
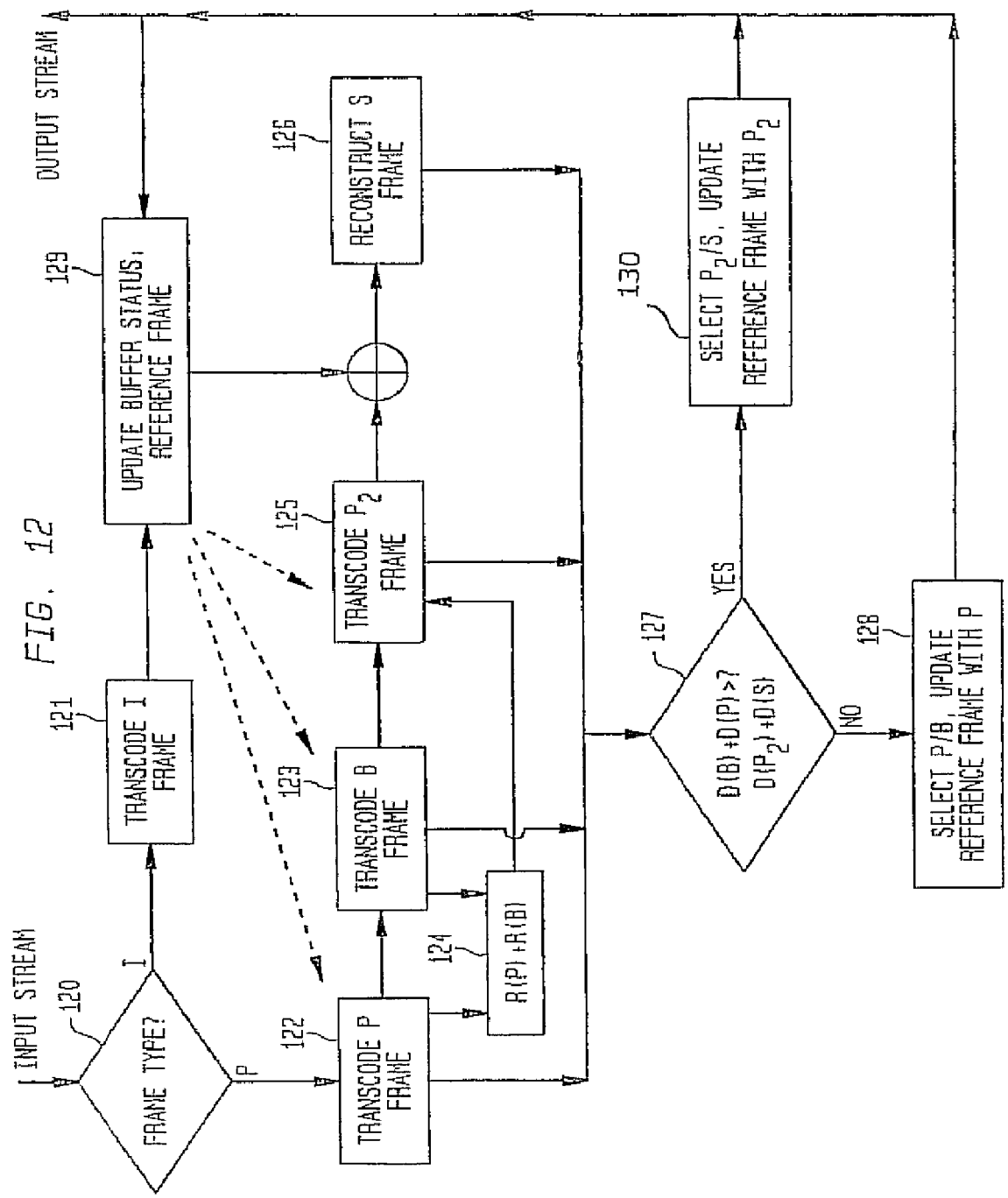
FIG. 12 is a logic flow diagram of the adaptive frame rate method employed in transcoding.

The flow diagram of the operation of a transcoder operating pursuant to the present invention is shown in FIG. 12. First, the frame type is obtained at 120 from the header information. If it is an I frame, it is transcoded at 121. Since an I frame by itself is a sub-GOP, it cannot be skipped and the transcoding process is the same as that of a T2 transcoder. If it is a (B, P) pair, then adaptive frame rate transcoding with joint temporal-spatial rate control is applied to this sub-GOP. This adaptive frame rate transcoding with joint temporal-spatial rate control procedure consists of five steps labeled by A, B, C, D and E.

Step A: Transcode the P frame at 122 using a process as in a T2 transcoder. Obtain its rate (the consumed bit count designated by R(P)) and distortion (such as PNR (Peak Signal-to-Noise Ratio) or SAD (Sum of Absolute Difference)) designated by D(P)) in comparison with the input down-sampled video frame.

Step B: Similar to Step A, transcode the following B frame at 123 using a process as in a T2 transcoder, and obtain its rate designated by R(B) and distortion designated by D(B).

Step C: Take the sum of R(B) and R(P) at 124 as the target bit count for the P frame, re-transcode the P frame at 125 at one half of the incoming frame rate and obtain $R(P_2)$ and $D(P_2)$.

Step D: Reconstruct the skipped frame S at 126 and calculate its distortion D(S), while the rate R(S) is zero. Since all bits assigned to this sub-GOP have been used to transcode the P frame ($P_2$) in Step C, the B frame here is the skipped frame (S), and is reconstructed by averaging the previous I or P frame (i.e. the last coded frame of the previous sub-GOP) and frame $P_2$ obtained in Step C.

Step E: Compare the sum (or average) distortion D(B)+D(P) and $D(S)+D(P_2)$ at 127. Since they consume about the same amount of bits, the approach with the smaller sum of distortion is preferred. If the D/B (D(B)+D(P)) approach is chosen at 128, both frames are transcoded, and finally the P frame is stored to the reference frame buffer at 129, and the process proceeds to the next sub-GOP. Otherwise, the $S/P_2$ approach is chosen at 130, and the $P_2$ frame is transcoded, while the S frame is a skipped frame, and the $P_2$ frame is stored to the reference frame buffer at 129, and the process proceeds to the next sub-GOP.

Having thus described our invention, what we claim as new, and desire to secure by Letter Patent is:

1. A method for transcoding an input compressed video signal stream to an output compressed signal stream comprising:
    a) performing adaptive frame rate transcoding for a sub-GOP (Group of Pictures), said sub-GOP comprising one or more types of frames of said input compressed signal stream to be transcoded; and,
    b) using a joint temporal-spatial rate distortion optimization within said sub-GOP to adjust the output rate of the compressed output signal stream, wherein for said sub-GOP, said joint temporal-spatial rate distortion optimization comprises:
        determining which frames of said sub-GOP to be either skipped or transcoded;
        computing a rate-distortion contribution resulting from each transcoded frame and from each skipped frame; and,
        minimizing a total distortion for a target rate of said compressed output signal stream based on said transcoded frame and skipped frame rate-distortion contributions.

2. The method of claim 1, wherein a frame set S is defined to indicate certain frames to be either skipped or transcoded, said set $S=[S_1, S_2, \ldots S_N)$, $S_i \in [0,1]$, $I=1, \ldots N$, with 0 denoting a frame to be skipped and 1 denoting a frame to be transcoded and N denoting a total number of frames in said sub-GOP, said adaptive frame rate transcoding further comprising: determining a status of a frame in said sub-GOP based on its corresponding value in set S.

3. The method of claim 2, wherein the signal stream is a video stream compressed pursuant to the standards of the Moving Picture Experts Group (MPEG), and within a Group of Pictures (GOP) three types of pictures are distinguished according to the compression method which is used, Intra-mode pictures (I pictures) which are compressed independently of any other picture, Predictively motion-compensated pictures (P pictures) which are reconstructed from the compressed data in that picture and two most recently reconstructed fields from previously displayed I or P pictures, and Bidirectionally motion-compensated pictures (B pictures) which are reconstructed from the compressed data in that picture plus two reconstructed fields from previously displayed I or P pictures and two reconstructed fields from I or P pictures that will be displayed in the future, wherein I and P pictures are termed reference pictures because they are used to reconstruct other pictures.

4. The method of claim 2, further including transcoding all reference I and P pictures because of the reuse of motion vectors and to maintain the prediction sequential order, while not transcoding and skipping some or all B pictures that are non-reference pictures.

5. The method of claim 4, wherein skipped B pictures are reconstructed at the decoder to ensure a full frame rate playback.

6. The method of claim 3, further including:
    determining whether a picture is an I picture, a B picture or a P picture type from the picture header information;
    transcoding all I pictures; and
    if a series of pictures comprises a (B, P) pair, which starts with a B picture, and having zero or more intermediate B pictures, and ends with a P picture, applying adaptive picture rate transcoding with joint temporal-spatial rate distortion optimization to the series of pictures of the (B, P) pair.

7. The method of claim 6, wherein the adaptive picture rate transcoding with joint temporal-spatial rate distortion optimization comprises the following steps:
    a. transcoding a P picture to obtain its rate denoted by R(P), which is the bit count consumed by transcoding the P picture, and its distortion denoted by D(P), such as PNR (Peak Signal-to-Noise Ratio) or SAD (Sum of Absolute Differences), in comparison with the input down-sampled video picture;
    b. transcoding the following B picture to obtain its rate denoted by R(B), which is the bit count consumed by transcoding the B picture, and its distortion denoted by D(B), such as PNR (Peak Signal-to-Noise Ratio) or SAD (Sum of Absolute Differences), in comparison with the input down-sampled video picture;
    c. summing R(B) and R(P) as a target bit count for the P picture, re-transcode it at one half of the incoming picture rate to obtain $R(P_2)$ and $D(P_2)$;
    d. reconstructing a skipped picture and calculate its distortion D(S), while the rate R(S) is zero, wherein the B picture is the skipped picture (S) and is reconstructed by averaging the previous I or P picture, which is the last coded picture of the previous sub-GOP, and picture $P_2$ obtained in step c;
    e. comparing the sum of distortion D(B)+D(P) with the sum of distortion $D(S)+D(P_2)$.

8. The method of claim 7, wherein following the comparing step, selecting the smaller sum of distortion, and if the sum of distortion D(B)+D(P) is chosen, both frames are transcoded, otherwise, only the P frame is transcoded, and storing the P frame in a reference frame buffer, and proceed to the next sub-GOP.

9. The method of claim 7, wherein said rate distortion optimization within said sub-GOP comprises determining values Q* and S*, such that $$[Q^*, S^*] = \underset{Q,S}{\operatorname{argmin}} \sum_{i=1}^{N} D_i(Q, S)$$

$$\text{subject to } \sum_{i=1}^{N} R_i(Q, S) \leq B_{target},$$

where Ri=the number of bits used to code the ith frame; Di=the distortion of the ith frame resulted from the compression; B_target=the target number of bits to compress the N frames in the sub-GOP, and, where Q denote a set of quantization parameter (QP) of each non-skipped frame according to:

$Q=[Q_1, Q_2, Q_N], Q_i \epsilon [Q_{min}, Q_{max}], \ldots, N$ and,

N is the total number of frames in a sub-GOP, and $S_N$ value is set to 1 representing it is to be coded.

10. The method of claim 1, wherein said adaptive frame rate transcoding processes on the basis of one sub-GOP at a time.

* * * * *